March 24, 1970 R. H. HUBNER 3,501,853
ROTATING COLORIMETER
Filed Nov. 13, 1967
2 Sheets-Sheet 1
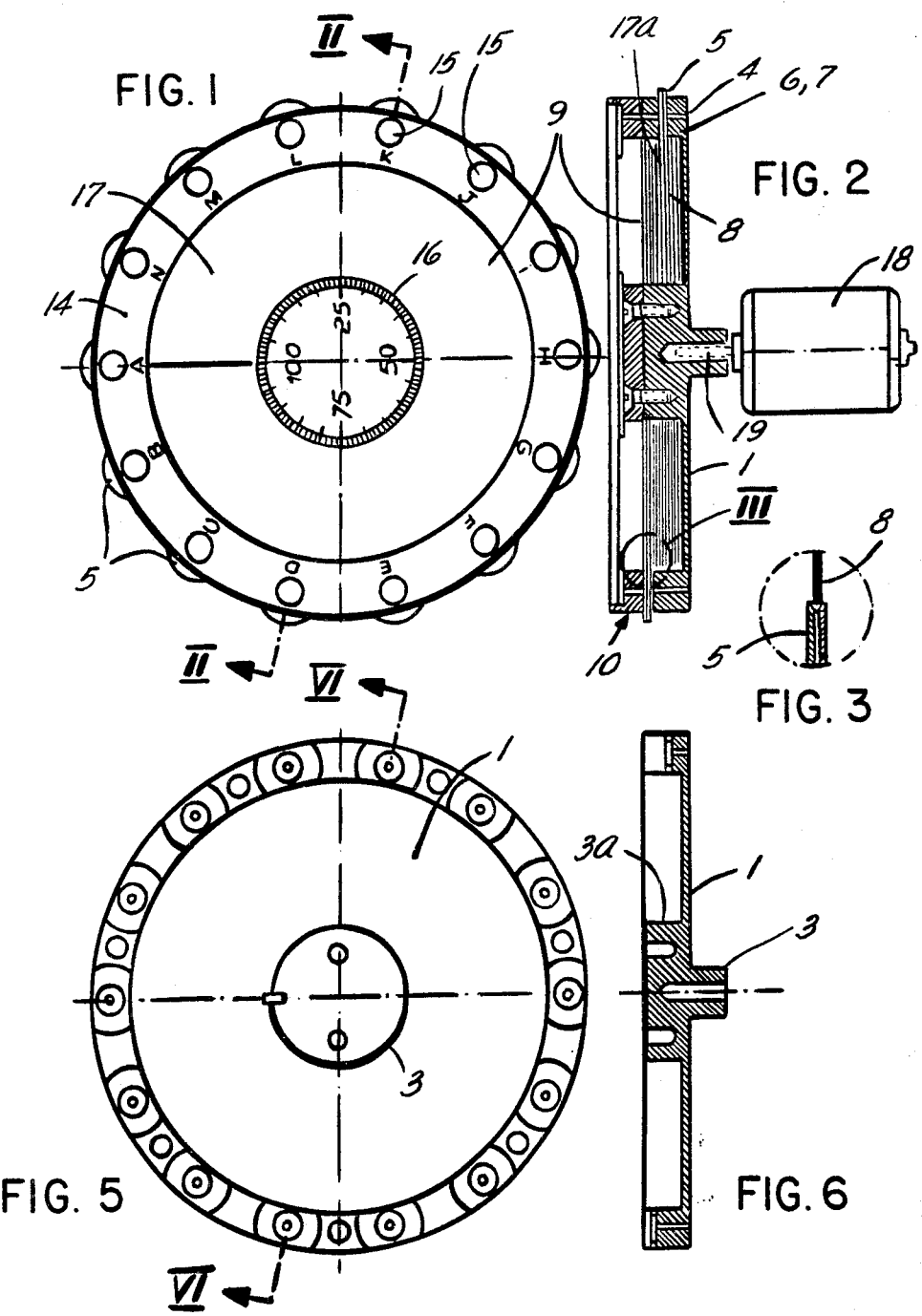

United States Patent Office
3,501,853
Patented Mar. 24, 1970

3,501,853
ROTATING COLORIMETER
Rolf H. Hubner, Gabelsbergerstr. 31,
Dortmund 46, Germany
Filed Nov. 13, 1967, Ser. No. 682,438
Int. Cl. G09b 23/00
U.S. Cl. 35—28.3                                    5 Claims

ABSTRACT OF THE DISCLOSURE

A device for the presentation of color effect or apparent color. A rotatable carrier has mounted thereon a plurality of color elements adapted to be moved in order to have the relative angular exposure varied. The color elements each have a color band, which may be a flexible strip of material, and the bands are mounted in superposed relationship on the carrier. Each band is adapted to extend beyond and retract beneath the next overlying band in order to vary the extent of exposure of each band. A masking element is adapted to have exposed portions of the bands in front of and concealed portions behind the element. A slot is in the masking element for passage of the band therethrough. Driving means, which may be manually operable, rotatable elements are provided to adjust the extent of exposure of each color. The carrier is generally disc-like and has an axially projecting rim peripherally enclosing the bands. The masking element and carrier cooperate to define an annular chamber for accommodating concealed portions of the band. A motor is connected to the carrier adapted to rotate the same.

BACKGROUND OF THE INVENTION

This invention relates to a device for the presentation of an apparent color, with each device comprising a rotatable carrier having color elements of different colors respectively.

In known devices of this kind, the color elements are formed by painting respective portions of the surface of the carrier with differently colored paints. Fast rotation of the carrier renders it impossible for the eye of an observer to follow each individual element along its path of movement due to rotation of the carrier, and the eye absorbs only the overall or apparent color produced by all the color elements in combination.

This apparent color depends upon the respective colors of the color elements present on the carrier, and upon the angles subtended by the extremities of these color elements respectively at the axis of rotation of the carrier.

SUMMARY OF THE INVENTION

The present invention is based upon the principle that it is possible to produce any desired color effect or apparent color by means firstly of an appropriate selection of colors for the color elements, and secondly by appropriate selection of the angles subtended by the color elements.

One of the objects of the present invention is to provide a new and improved form of device for the presentation of an apparent color which includes means for changing the apparent color presented, preferably such change occurring steplessly so that the apparent colors produced merge smoothly with each other.

According to the invention, a device for the presentation of an apparent color comprises a rotatable carrier on which are mounted a plurality of color elements of different respective colors, such color elements being so arranged that the relative values of the angles subtended at the center of rotation by exposed portions of the color elements can be varied.

The color elements may be so arranged that their exposed portions collectively form a ring, or at least a segment of a ring, concentric with the axis of rotation of the carrier.

Each color element may thus comprise a band and the bands may be mounted in superposed relation on the carrier in a manner such that each band can be extended beyond and retracted beneath that next band overlying it, thereby exposing a variable portion of the length of such band circumferentially beyond one end of the overlying band.

In one form of the invention, the bands are mounted for exposure at an axially presented face of the carrier, and each band comprises a piece of flexible strip material, the exposed portions of which collectively form an annulus, or a segment of an annulus, at said axially presented face of the carrier.

The carrier may have a masking element and the color elements may be so mounted that concealed portions of them lie behind such masking element and exposed portions in front of such masking element.

A further object of the invention is to provide driving means for the color elements operable to adjust the extent of the exposed portion of each color element. In a form of the device wherein each color element comprises a band and the bands are mounted in superposed relation as aforesaid, the driving means may comprise a plurality of manually operable rotary elements engaged with edge faces and/or margins of the bands. Such rotary elements may be mounted on the carrier at positions spaced apart angularly about the axis of rotation thereof.

Another object of this invention is to provide a device as described above, affording simplicity of design and adapted for ease of substitution of the color elements.

Other objects and advantages of the invention will be understood from the following description of the invention, on reference to the illustrations appended hereto.

BRIEF DESCRIPTION OF THE DRAWINGS

FIGURE 1 is a plan view of the embodiment.
FIGURE 2 is a view in cross-section on the line II—II of FIGURE 1.
FIGURE 3 is an enlarged fragmentary view in the same cross-sectional plane as that of FIGURE 2 showing a portion of the periphery of one of the color elements and the driving element therefor.
FIGURE 5 is a plan view of the bottom component part of the carrier as seen in FIGURE 4.
FIGURE 6 is a cross-sectional view of the component shown in FIGURE 5 on the line VI—VI of FIGURE 5.

DESCRIPTION OF THE PREFERRED EMBODIMENTS

Figure 4:
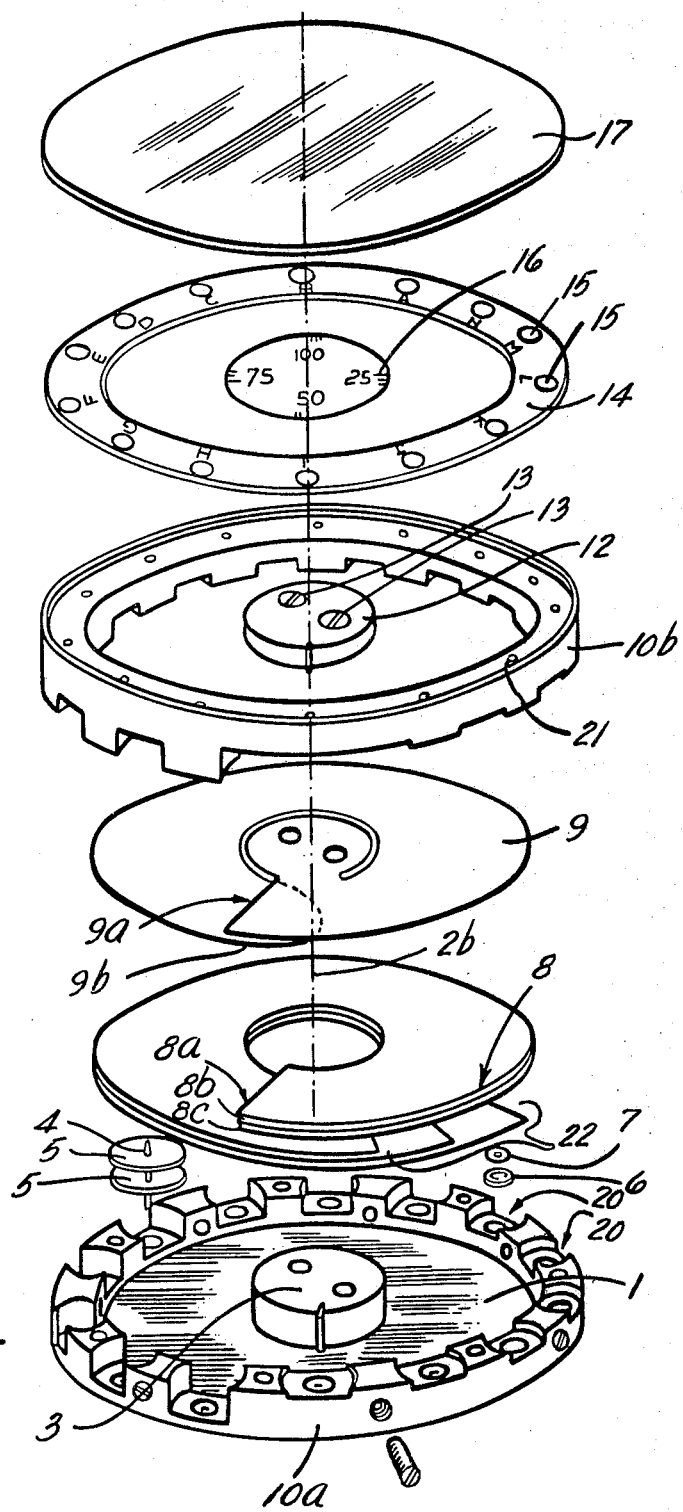
FIGURE 4 is an enlarged perspective view of the embodiment.

The embodiment of the device shown in the drawings for the presentation of an apparent color by "mixture" of the individual colors presented over predetermined exposed areas of individual color elements comprises a rotary carrier mounted on the spindle of, and driven by, a motor 18 which may be an electric motor, for example.

The carrier comprises a bottom component of generally disc-like form including a disc portion 1 and an axially projecting rim 10 adjacent to the periphery of the disc portion 1 and integrally connected therewith.

The carrier has a central base 3 which acts as a pivot pin for the rotation of color elements hereinafter described.

A lower portion 3 of the base is formed integrally with the bottom component of the carrier.

In the annular chamber afforded by the bottom component of the carrier are mounted a plurality of color elements 8 of which only three are shown in FIGURE 4 for simplicity, these being designated 8a, 8b and 8c. Each color element is in the form of a band of annular form made from a flexible material but one having sufficient stiffness to avoid crumpling or crinkling in use and arranged in a plane generally at right angles to the axis of rotation of the carrier as indicated by the dashed line 26.

The bands 8a and 8c have inner boundaries which are a little larger than the external diameter of the boss 3a so that the bands are rotatable therearound. The bands are arranged in superposed relationship and each of them is of a length such that it extends around the axis 2b for more than one complete turn of 360°. Accordingly, the leading end portion of each band overlies the trailing or rearward end portion.

Further, the bands themselves are preferably of different lengths, the uppermost 8a being the shortest and the lowermost 8c, the longest.

The carrier is further provided with a masking element in the form of a disc 9 which is slit radially to provide a slot-like passageway or aperture 9a through which the bands 8a to 8c can be moved from the underside of the disc 9 to the top or exposed side thereof. To guide the bands 8a to 8c through the slot or aperture, the disc 9 is provided with a ramp portion 9b which lies beneath a portion of the disc and forms the lower boundary of the slot or aperture 9a.

The disc 9 is secured in position by being clamped between the lower component 3a of the boss and an upper component 12 thereof, clasping screws 13 countersunk in the upper component 12 having their shanks passing through holes 9c in the disc 9 and engaging in internally screw-threaded sockets in the lower component 3a of the boss 3.

For the purpose of adjusting the position of each of the bands individually, driving means are provided comprising a plurality of manually operable rotary elements of which, for simplicity, only one is illustrated in FIGURE 4.

These rotary elements comprise a pair of driving discs 5 rotatably mounted on a pin 4 and overlapping marginally with an associated one of the bands such as 8a as seen in FIGURE 3.

Each pair of driving discs is accommodated in a respective recess, as indicated at 20, formed in the rim 10a of the bottom component of the carrier. These recesses have depths which differ respectively from each other, and conveniently increase in a counterclockwise direction around the rim starting with the recess of smallest depth, whereby each pair of driving discs lies one above and the other beneath, a respective one of the bands such as 3a to 8c.

It will be evident that the discs are of a diameter such that they protrude radially outwardly of the rim 10a as seen, particularly in FIGURE 1, and the peripheries of the discs can, therefore, be engaged by a finger or thumb of the user and rotated. If desired, the edge faces of the discs may be knurled to facilitate such rotation.

Each pair of driving discs is subjected to axially directed pressure to maintain the discs in pressure contact with the peripheral margin of the associated band.

For this purpose, there is disposed on each pin 4, below the lower disc 5, a washer 6 of resilient material such as rubber and a further washer 7 is provided between the washer 6 and the lower disc 5 and made of a material which avoids frictional resistance being imposed on the lower disc 5 by the rubber or other washer 6.

The carrier further comprises an upper component 10b of generally annular form provided at its underside with projections 21, the dimensions of which measured axially increase in a counterclockwise direction around this component starting with that of the smallest axial dimensions so that they correspond respectively to the increasing depth of the recesses 20 with which they register. Thus, each pair of discs 5 and associated resilient washer 6 are subjected to an equal compression upon securing the upper component 10b to the lower component.

Both the rim 10a and the upper component 10b include holes which receive the pins 4 of the driving discs.

The upper component 10b is recessed at its upper side and receives an indicator element 14 of annular form having markings 15 appropriate to identify the color of the particular band rotated about the boss 3 by operation of the driving discs coaxial with, or adjacent to, the marking. Such markings may be in the form of colors corresponding to those of the associated bands, or may be letters or other indicia.

A further indicator element in the form of a disc 16 may overlie the upper component 12 of the boss 3. This element may be marked peripherally with graduations and numerals as seen particularly in FIGURE 1.

Overlying the indicator element 14 is a cover plate 17 of colorless transparent material secured in a suitable manner in the recess afforded by the upper surface of the upper component 10b of the carrier. It will be observed that in FIGURE 2, an ample axial clearance is left between the cover plate 17 and the masking disc 9 to form an annular chamber 17a into which portions of the bands forming the color elements can be moved by operation of the appropriate driving elements. Conveniently, the indicator element 16 may be secured to the underside of the cover plate.

As seen in FIGURES 1 and 2, the whole length of each band forming a color element is contained in the annular chamber defined by the bottom component of the carrier and the masking disc 9, so that none of these color elements is visible from the top or exposed side of the masking disc.

Each or any of the bands can be moved angularly about the axis of the boss 3 to project a portion thereof through the slot or aperture 9a so that such portion is then exposed beneath the transparent cover plate 17.

Where more than one color is required to be made visible, it will be evident that the bands concerned must be advanced by their appropriate driving elements so that the lowermost for example, 8c, is advanced to the furthest extent, the next highest of the color bands such as 8b advanced to a somewhat smaller extent, and the topmost of the selected color bands advanced to the least extent, for example 8a.

The angle subtended by each exposed portion of the color band will be that included between a radius drawn from the axis 2b to the free or leading end of the band and a radius drawn to the free or leading end of the band next above it, and which has been selected for projection through the slot or aperture 9a In the case of the topmost band selected for projection, the angle subtendend by the exposed portion is that included between a radius drawn to the free or leading end of the band and a radius drawn to the mouth of the slot 9a registering with the edge.

If desired, the exposed face of the masking disc may have a color different from the colors of the bands and selected to be suitable as a reference color, for example, white.

The construction admits of the stepless adjustment of the angle subtended by the exposed portion of each band forming a color element. Such adjustment can be carried out readily by means of the associated driving discs 5 and such angle can readily be selected to be of a predetermined value utilizing the scale markings 16.

Consequently for any given set of color elements, a chart or code can be imposed to produce a predetermined apparent color, such chart or code containing an identification of the particular bands to be exposed and the angle to be subtended by the exposed portion of each selected band.

Further, it is possible readily to remove and replace any or all of the bands forming the color elements by removal of the securing screws 13 after first removing the cover plate 17.

It will be understood that it would be possible to utilize color elements in the form of bands which do not necessarily have a length extending for more than 360° about the axis of rotation provided that their leading ends remain above the ramp portion 9b of the masking disc when the color elements are in their fully retracted positions.

Further, instead of, or in addition to, contact between the driving discs and the marginal surfaces of the bands forming the color elements, these may be driven, through contact with their edges, by a rotary element driven with the discs and disposed between them to engage the edge of the associated color band.

Whereas particular embodiments of the invention have been described above for purposes of illustration, it will be apparent to those skilled in the art that numerous variations of the details may be made without departing from the appended claims.

I claim:

1. A device for the presentation of an apparent color comprising,
   a rotatable carrier having a masking element mounted thereon and a chamber beneath said masking element,
   a plurality of color element bands mounted in superimposed relation on said carrier in said chamber beneath said masking element,
   said masking element having a slot with a ramp extending from one edge thereof into overlapping relation with the opposite edge of said slot, said ramp disposed behind the lowermost of said superimposed color element bands,
   said color element bands mounted in said carrier chamber so that concealed portions of said color element bands lie behind said masking element and exposed portions extend through said slot and lie in front of said masking element,
   said color element bands arranged so that their exposed portions collectively form at least a segment of a ring concentric with the axis of said carrier,
   said color element bands arranged to extend and retract beneath the next overlying band and through said masking element slot to expose a variable portion of the length of such band beyond an end of an overlying band,
   driving means for said color element bands operable to adjust the extent of the exposed portion of each color element band,
   said driving means including a plurality of manually operable rotary elements engaged with edges of said bands,
   said rotary elements for respective bands are mounted on said carrier at positions spaced angularly about the axis of rotation of said carrier, and
   each said driving element includes portions overlapping marginally with the associated band on opposite sides thereof respectively and maintained in pressure contact therewith.

2. A device according to claim 1 wherein
   each driving element comprises a pair of driving discs mounted on a pin together with resilient means for exerting axial pressure on the discs to maintain them in pressure contact with the associated band.

3. A device according to claim 2 wherein
   said carrier is of generally disc-like form having adjacent to its periphery an axially projecting rim peripherally enclosing the bands,
   said masking element is of disc-like form and in combination with the carrier defines an annular chamber for the accommodation of the concealed portions of the bands, and
   said driving means for said bands is accommodated in chambers formed in said axially projecting rim of said carrier.

4. A device according to claim 3 wherein
   said carrier is provided with an indicator element having markings relating the rotary driving elements with respectively associated bands, and
   said masking element has an exposed face of a color differing from those of the color elements adapted to serve as a reference color.

5. A device according to claim 3 wherein
   the color elements are removably mounted on the carrier to permit any of them to be removed and replaced by a color element of a different color.

References Cited

UNITED STATES PATENTS 2,606,373  8/1952  Lamberger ---------- 35—28.3
3,101,558  8/1963  Young -------------- 35—28.3 X EUGENE R. CAPOZIO, Primary Examiner HARLAND S. SKOGQUIST, Assistant Examiner